United States Patent
Suzuki

(10) Patent No.: US 11,603,128 B2
(45) Date of Patent: Mar. 14, 2023

(54) STEERING CONTROL METHOD AND STEERING CONTROL DEVICE

(71) Applicant: Nissan Motor Co., Ltd., Yokohama (JP)

(72) Inventor: Taku Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/266,135

(22) PCT Filed: Aug. 8, 2018

(86) PCT No.: PCT/JP2018/029791
§ 371 (c)(1),
(2) Date: Feb. 5, 2021

(87) PCT Pub. No.: WO2020/031294
PCT Pub. Date: Feb. 13, 2020

(65) Prior Publication Data
US 2021/0309292 A1    Oct. 7, 2021

(51) Int. Cl.
*B62D 6/00* (2006.01)

(52) U.S. Cl.
CPC .............. *B62D 6/008* (2013.01); *B62D 6/002* (2013.01)

(58) Field of Classification Search
CPC .......... B62D 6/008; B62D 6/002; B62D 6/00; B62D 6/003; B62D 6/006; B62D 6/005; B62D 15/025; B62D 5/0463; B62D 5/001; G01C 21/00; G01C 21/04; G01C 21/166; G01C 21/20; B60W 10/00; B60W 30/00; B60W 30/02; B60W 30/025; B60W 30/04;
(Continued)

(56) References Cited

U.S. PATENT DOCUMENTS

| 2002/0103589 | A1* | 8/2002 | Millsap | B62D 5/006 |
| | | | | 180/443 |
| 2013/0124049 | A1* | 5/2013 | Endo | B62D 6/008 |
| | | | | 701/42 |
| 2019/0367083 | A1* | 12/2019 | Kodera | B62D 6/04 |

FOREIGN PATENT DOCUMENTS

| CN | 103863393 A | * | 6/2014 |
| CN | 106394665 A | | 2/2017 |

(Continued)

*Primary Examiner* — Adam R Mott
*Assistant Examiner* — Erick T. Detweiler
(74) *Attorney, Agent, or Firm* — Global IP Counselors, LLP

(57) ABSTRACT

A steering control method controls the steering of a vehicle having a steer-by-wire steering mechanism. A steering reaction force is set that includes a restoration component for restoring a steering angle of the steering wheel to a reference angle, a viscous component corresponding to a steering angular velocity of the steering wheel, and a friction component corresponding to the steering angular velocity. An actuator is controlled to apply a rotational torque to the steering wheel for generating the steering reaction force. A turning angle of the steered wheel is controlled in accordance with the steering angle. A target travel path is set upon determining the driver is not operating the steering wheel. The actuator is controlled such that the steering angle becomes a target steering angle for causing the vehicle to travel along the target travel path to suppress the friction component of the steering reaction force.

5 Claims, 7 Drawing Sheets

(58) Field of Classification Search
CPC ..... B60W 2030/041; B60W 2030/043; B60W 30/0953; B60W 30/0956; B60W 30/10; B60W 30/12; B60W 30/165; B60W 30/18163; B60W 30/18172; B60W 60/00; B60W 60/001; B60W 60/0013; B60W 60/0015; B60W 60/0016; B60W 60/0018; B60W 60/00182; B60W 10/20; B60W 50/16

See application file for complete search history.

(56) References Cited

FOREIGN PATENT DOCUMENTS

| | | |
|---|---|---|
| JP | 2007-137287 A | 6/2007 |
| JP | 2015-150933 A | 8/2015 |
| WO | 2012/086502 A1 | 6/2012 |

* cited by examiner

STEERING CONTROL METHOD AND STEERING CONTROL DEVICE

CROSS-REFERENCE TO RELATED APPLICATIONS

This application is a U.S. national stage application of International Application No. PCT/JP2018/029791, filed on Aug. 8, 2018.

BACKGROUND

Technical Field

The present invention relates to a steering control method and a steering control device.

Background Information

Japanese Laid-Open Patent Application No. 2007-137287 (Patent Document 1) discloses a steering device for application of a target reaction force torque, calculated by the addition of a friction torque that corresponds to the steering angular velocity, a viscous torque that corresponds to the steering angular velocity, and a self-aligning torque. A prescribed number of pulse signals output from a steering angle sensor are cleared to set the friction torque to "0," in order to eliminate fluctuations caused by minute vibrations of the steering wheel, and to apply a target reaction force torque that changes smoothly.

SUMMARY

In a vehicle that employs a steer-by-wire steering mechanism, the steering wheel and the steered wheels are mechanically separated. Thus, it is possible to generate pseudo-steering reaction force with an actuator in order to improve the steering feel. However, when the steering angle of the steering wheel is controlled by means of automatic steering control in order to control the steered wheels in accordance with the steering angle of the steering wheel, there are cases in which the steering angle fluctuates due to the steering reaction force generated by the actuator, thereby hindering the smooth steering controlled by the automatic steering control. An object of the present invention is to apply a steering reaction force to the steering wheel, which enables smooth steering by means of the automatic steering control.

One aspect of the present invention is a steering control method for a vehicle equipped with a steer-by-wire steering mechanism in which the steering wheel and the steered wheels are mechanically separated. The steering control method comprises setting a steering reaction force, which includes a restoration component for restoring the steering angle of the steering wheel to a reference angle, a viscous component that corresponds to the steering angular velocity of the steering wheel, and a friction component that corresponds to the steering angular velocity; and controlling an actuator that applies rotational torque to the steering wheel such that the steering reaction force is generated in the steering wheel; controlling the turning angle of the steered wheels in accordance with the steering angle; determining whether a driver is operating the steering wheel and setting a target travel path over which the vehicle travels when the driver is not operating the steering wheel; and controlling the actuator such that the steering angle of the steering wheel becomes a target steering angle for causing the vehicle to travel along the target travel path, in order to suppress the friction component included in the steering reaction force.

According to one aspect of the present invention, it is possible to apply a steering reaction force to the steering wheel that enables smooth steering by means of automatic steering control. The object of the present invention and its advantages are embodied and achieved by utilizing the elements illustrated in the Claims and combinations thereof. Both the general description described above and the specific description below are merely examples and explanations and should not be understood to limit the present invention as in the Claims.

BRIEF DESCRIPTION OF THE DRAWINGS

Referring now to the attached drawings which form a part of this original disclosure.

DETAILED DESCRIPTION OF EMBODIMENTS

Figure 1:
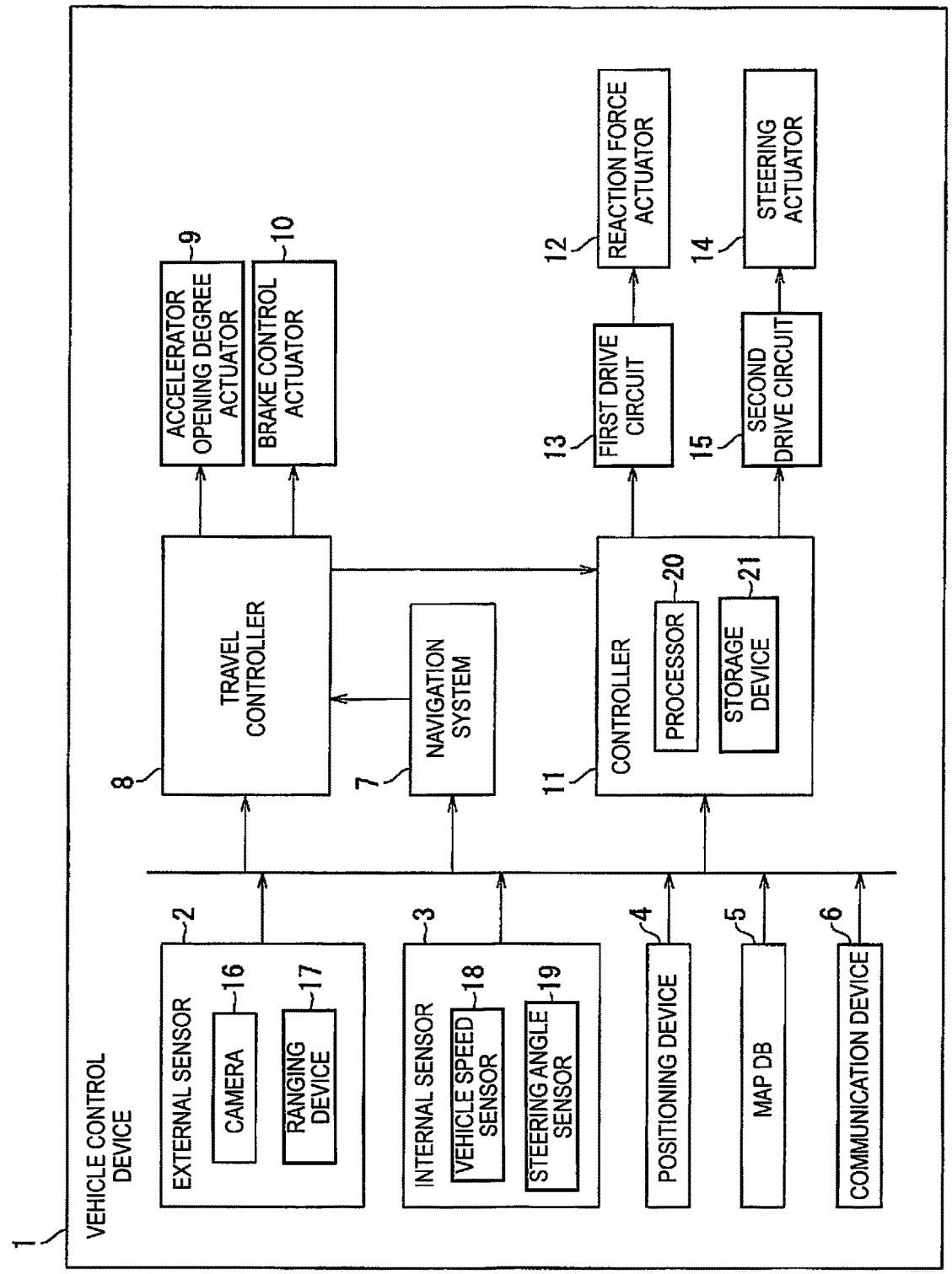
FIG. 1 is a schematic overview of one example of a vehicle control device according to an embodiment.

An embodiment of the present invention is described below with reference to the drawings. Reference is made to FIG. 1. A vehicle equipped with a vehicle control device 1 (hereinafter referred to as "host vehicle") is provided with a steer-by-wire steering mechanism in which the steering wheel and the steered wheels are mechanically separated. The vehicle control device 1 controls the turning angle of the steered wheels and the steering reaction force that is applied to the steering wheel.

In addition, the vehicle control device 1 carries out autonomous driving control, wherein the host vehicle is automatically driven without the involvement of a driver, as well as driving assistance control, wherein a driver is assisted in the driving of the host vehicle. The driving assistance control includes, for example, lane-keeping control, preceding vehicle following control, automatic braking control, cruise control, etc.

The vehicle control device 1 comprises an external sensor 2, an internal sensor 3, a positioning system 4, a map database 5, a communication device 6, a navigation system 7, a travel controller 8, an accelerator opening degree actuator 9, a brake control actuator 10, a controller 11, a reaction force actuator 12, a first drive circuit 13, a turn actuator 14, and a second drive circuit 15. In the appended drawings, the map database is referred to as "map DB."

The external sensor 2 senses the surroundings of the host vehicle for the detection of objects around the host vehicle, for example. The external sensor 2 can include, for example, a camera 16 and a distance measuring device 17. The camera 16 and the distance measuring device 17 sense the surroundings of the host vehicle to detect the presence of objects around the host vehicle (such as, other vehicles, pedestrians, white lines such as lane markers and dividing lines, and features provided on or around roads, such as traffic lights, stop lines, signs, buildings, utility poles, curbs, and pedestrian crossings), the relative positions of objects with respect to the host vehicle, and relative distances between objects and the host vehicle.

The camera 16 can be, for example, a stereo camera. The camera 16 can be a monocular camera, and the monocular camera can photograph the same object from multiple points of view to calculate the distance to the object. In addition, the distance to the object can be calculated based on the ground contact position of the object detected from the image captured by the monocular camera. The distance measuring device 17 can be, for example, a laser range finder (LRF), a radar unit, or a laser scanner. The camera 16 and the distance measuring device 17 output data from the outside, which is detected information of the surroundings, to the navigation system 7, the travel controller 8, and the controller 11.

The internal sensor 3 senses the travel state of the host vehicle. The internal sensor 3 can include, for example, a vehicle speed sensor 18 and a steering angle sensor 19. The vehicle speed sensor 18 detects the vehicle speed of the host vehicle. The steering angle sensor 19 detects the column shaft rotation angle, that is, a steering angle $\theta s$ (steering wheel angle) of the steering wheel. The internal sensor 3 can include an acceleration sensor for detecting the acceleration of the host vehicle, and a gyro sensor for detecting the angular velocity of the host vehicle. The internal sensor 3 outputs travel state data, which is the detected state of travel information, to the navigation system 7, the travel controller 8, and the controller 11.

The positioning system 4 receives radio waves from a plurality of navigation satellites to acquire the current position of the host vehicle, and outputs the acquired current position of the host vehicle to the navigation system 7 and the travel controller 8. The positioning system 4 can have, for example, a GPS (Global Positioning System) receiver, or another global positioning system (GNSS: Global Navigation Satellite System) receiver other than a GPS receiver.

The map database 5 stores road map data. The road map data include shapes (lane shape) and coordinate information of white lines such as lane boundaries and dividing lines, and coordinate information regarding features on or around roads, such as traffic lights, stop lines, signs, buildings, utility poles, curbs, and pedestrian crossings. The road map data can further include information relating to road type, road gradient, number of lanes, speed limit (legal speed), road width, the presence or absence of road junctions, and the like. Road types can include, for example, general roads and expressways. The map database 5 is referenced by the navigation system 7 and the travel controller 8.

The communication device 6 carries out wireless communication with a communication device external to the host vehicle. The communication method of the communication device 6 can be, for example, wireless communication by means of public mobile phone networks, vehicle-to-vehicle communication, road-to-vehicle communication, or satellite communication. Instead of or in addition to the map database 5, the navigation system 7, the travel controller 8, and the controller 11 can acquire road map data from an external information processing device by means of the communication device 6.

The navigation system 7 provides occupants of a host vehicle with route guidance to a destination set on a map by the driver of the host vehicle. The navigation system 7 estimates the current position of the host vehicle using various types of information input from the external sensor 2, the internal sensor 3, and the positioning system 4, generates a route to the destination, and provides the occupants with route guidance. The navigation system 7 outputs the route information to the travel controller 8.

The travel controller 8 carries out lane maintenance control, driving assistance control such as preceding vehicle following control, automatic brake control, and constant speed travel control, and autonomous driving control in which the host vehicle is automatically driven without the involvement of the driver. For example, in the driving assistance control, the travel controller 8 sets a target travel path over which the host vehicle should travel based on the result of positioning by the positioning system 4, the surroundings detected by the external sensor 2, the road map data of the map database 5, and the travel state of the host vehicle detected by the internal sensor 3. In the autonomous driving control, the travel controller 8 sets a target travel path over which the host vehicle should travel based on the route information output from the navigation system 7, the surroundings, the road map data, and the travel state of the host vehicle.

The travel controller 8 drives the accelerator opening degree actuator 9 and the brake control actuator 10 to control the driving force and the braking force of the host vehicle, such that the host vehicle travels along the target travel path. The accelerator opening degree actuator 9 controls the accelerator opening degree of the vehicle. The brake control actuator 10 controls the braking operation of the brake device of the vehicle.

In addition, when the driving assistance control and the autonomous driving control include automatic steering control, the travel controller 8 determines the target steering angle $\theta t$ for causing the host vehicle to travel along the target travel path. The travel controller 8 outputs the target steering angle $\theta t$ to the controller 11. The controller 11 is an electronic control unit (ECU) for carrying out steering control of the steered wheels and reaction force control of the steering wheel. The controller 11 includes a processor 20 and peripheral components such as a storage device 21. The processor 20 can be, for example, a CPU (Central Processing Unit) or an MPU (Micro-Processing Unit). The controller 11 can be an electronic control unit that is integrated with, or separate from, the travel controller 8.

The storage device 21 can be equipped with a semiconductor storage device, a magnetic storage device, and an optical storage device. The storage device 21 can include a memory, such as a register, a cache memory, ROM (Read Only Memory) and RAM (Random Access Memory), which are used as main storage devices, and the like. The controller 11 can be a functional logic circuit set in a general-purpose semiconductor integrated circuit. For example, the controller 11 can have a programmable logic device (PLD) such as a field programmable gate array (FPGA).

The controller 11 determines a command steering torque Tr, which is a command value of a rotational torque to be applied to the steering wheel, in accordance with the steering angle $\theta s$ of the steering wheel, a steering angular velocity Δθs, the vehicle speed of the host vehicle, and the target steering angle θt determined by the travel controller 8. At this time, the controller 11 determines whether the driver has operated the steering wheel, and, if the driver is not operating the steering wheel, determines the steering angle control torque such that the steering angle θs becomes the target steering angle θt.

The controller 11 outputs a control signal to the first drive circuit 13 to cause the reaction force actuator 12 to generate the determined rotational torque and drives the reaction force actuator 12 in order to apply the determined steering reaction force torque and the steering angle control torque to the steering wheel. The controller 11 determines the command turning angle, which is the command value of the turning angle of the steered wheels, in accordance with the steering angle θs and the steering angular velocity Δθs of the steering wheel that is operated by the driver or the reaction force actuator 12. The controller 11 outputs the determined command turning angle to the second drive circuit 15 and drives the turn actuator 14 such that the actual turning angle becomes the command turning angle.

Figure 2:
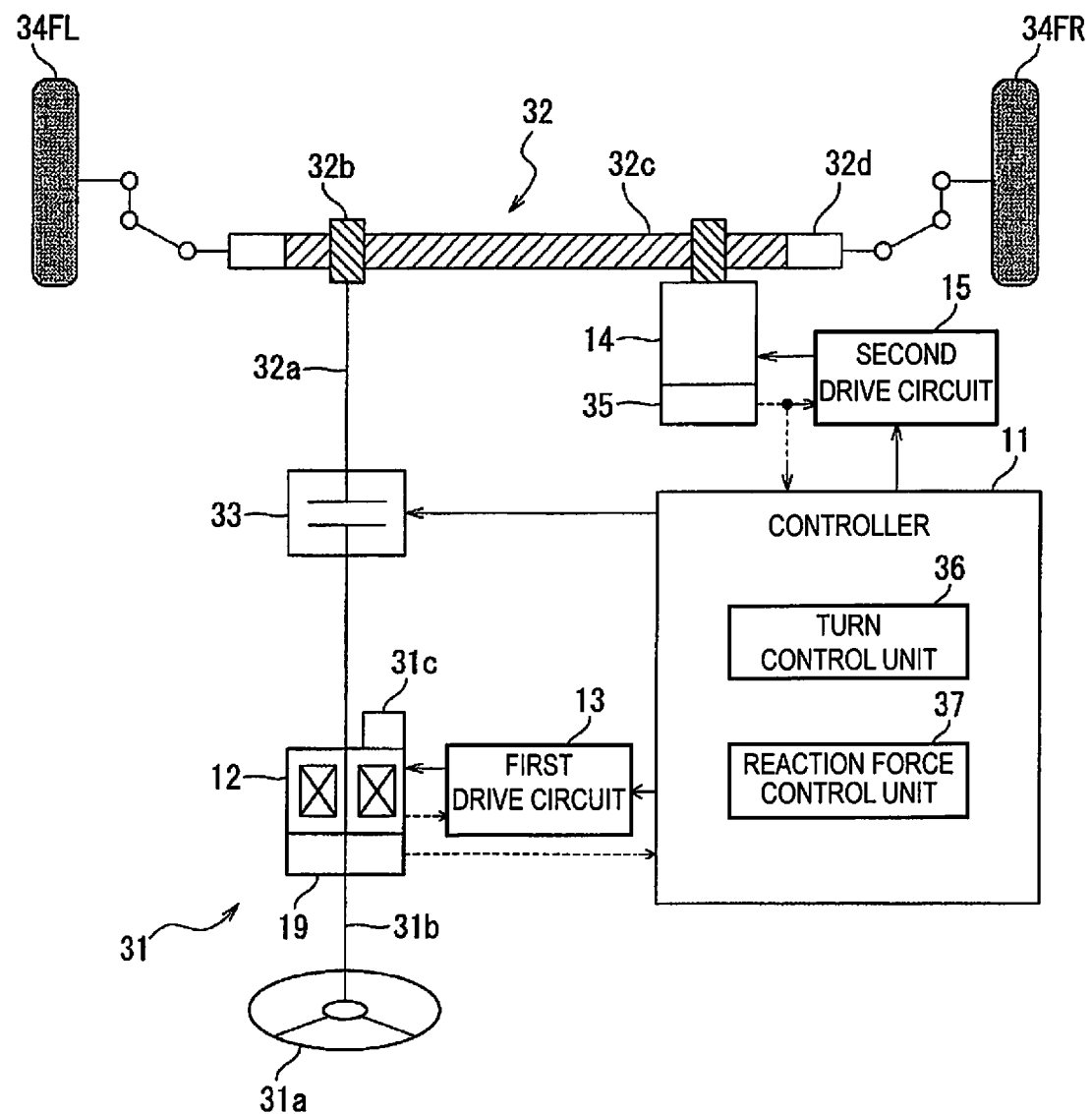
FIG. 2 is a schematic overview of one example of a steering system of a vehicle equipped with the vehicle control device.

The steering system of the host vehicle equipped with the steer-by-wire steering mechanism will be described with reference to FIG. 2. The host vehicle has a steering unit 31, a turning unit 32, and a backup clutch 33. When the backup clutch 33 is in the released state, the steering unit 31, which receives steering input from the driver, and the turning unit 32, which turns left and right front wheels 34FL, 34FR, which are the steered wheels, are mechanically separated.

The steering unit 31 includes a steering wheel 31a, a column shaft 31b, a current sensor 31c, the reaction force actuator 12, the first drive circuit 13, and the steering angle sensor 19. The turning unit 32 includes a pinion shaft 32a, a steering gear 32b, a rack gear 32c, a steering rack 32d, the turn actuator 14, the second drive circuit 15, and a turning angle sensor 35.

The controller 11 also includes a steering control unit 36 that determines the command turning angle in accordance with the steering angle θs and the steering angular velocity Δθs of the steering wheel 31a, and a reaction force control unit 37 that determines the command steering torque Tr in accordance with the steering angle θs, the steering angular velocity Δθs, the vehicle speed, and the target steering angle θt determined by the travel controller 8. A computer program, which is stored in the storage device 21 of the controller 11, for example, and executed by the processor 20, can perform the functions of the steering control unit 36 and the reaction force control unit 37. The reaction force actuator 12, the first drive circuit 13, and the controller 11 form the steering control device.

The steering wheel 31a of the steering unit 31 rotates in response to the steering inputs from the driver. The column shaft 31b rotates integrally with the steering wheel 31a. The reaction force actuator 12 can be an electric motor, for example. The reaction force actuator 12 has an output shaft disposed coaxially with the column shaft 31b. The reaction force actuator 12 outputs the rotational torque to be applied to the steering wheel 31a to the column shaft 31b, in accordance with the command current that is output from the first drive circuit 13. Application of the rotational torque causes the steering wheel 31a to produce the steering reaction force torque and the steering angle control torque.

The first drive circuit 13 controls the command current that is output to the reaction force actuator 12 by means of torque feedback that causes the actual steering reaction force torque, which is estimated from the drive current of the reaction force actuator 12 detected by the current sensor 31c, to match with the command steering torque Tr indicated by the control signal output from the reaction force control unit 37. The steering angle sensor 19 detects the rotation angle of the column shaft 31b, that is, the steering angle (steering wheel angle) θs of the steering wheel 31a.

The steering gear 32b of the turning unit 32 turns the left and right front wheels 34FL, 34FR in accordance with the rotation of the pinion shaft 32a. A rack-and-pinion-type steering gear, for example, can be employed as the steering gear 32b. The turn actuator 14 can be an electric motor, such as a brushless motor. The output shaft of the turn actuator 14 is connected to the rack gear 32c via a reduction gear. The turn actuator 14 outputs steering torque to the steering rack 32d for steering the left and right front wheels 34FL, 34FR in accordance with a command current output from the second drive circuit 15.

The turning angle sensor 35 detects the rotation angle of the output shaft of the turn actuator 14 and detects the turning angle of the left and right front wheels 34FL, 34FR based on the detected rotation angle. The second drive circuit 15 controls the command current to the turn actuator 14 by means of an angle feedback for matching the actual turning angle detected by the turning angle sensor 35 and the command turning angle indicated by the control signal from the steering control unit 36.

The backup clutch 33 is provided between the column shaft 31b and the pinion shaft 32a. When the backup clutch 33 is in the released state, the steering unit 31 and the turning unit 32 are mechanically separated, and in the engaged state, the steering unit 31 and the turning unit 32 are mechanically connected.

The functional configuration of the reaction force control unit 37 will be explained with reference to FIG. 3. The reaction force control unit 37 calculates the command steering torque Tr, which includes restoring torque Ts, which is the restoration component for restoring the steering angle θs of the steering wheel 31a to a prescribed reference angle, a viscous torque Tv, which is the viscous component corresponding to the steering angular velocity Δθs, and a friction torque Tf, which is the friction component corresponding to the steering angular velocity Δθs.

The restoring torque Ts is the steering reaction force torque that restores the steering angle θs to the prescribed reference angle by means of self-aligning torque (SAT). When the steering angle θs is not controlled by means of automatic steering control of the travel controller 8, the reaction force control unit 37 sets the reference angle to the neutral position of the steering wheel 31a, and calculates the restoring torque Ts for restoring the steering angle θs to the neutral position.

The restoring torque Ts characteristic when the steering angle θs is not controlled by means of automatic steering control will be described with reference to FIG. 4A. The horizontal axis indicates the steering angle θs, and the vertical axis indicates the restoring torque Ts. Here, the sign of the steering angle θs for turning right, that is, the steering angle θs for clockwise steering, is positive, and the sign of the steering angle θs for turning left, that is, the steering angle θs for counterclockwise steering, is negative. In addition, the sign of the restoring torque Ts for counterclockwise steering is positive, and the sign of the restoring torque Ts for clockwise steering is negative. When the steering angle θs is not controlled by means of automatic steering control, the restoring torque Ts is zero when the steering angle θs is zero, the counterclockwise restoring torque Ts is generated when the steering angle θs increases from zero in the clockwise direction, and the clockwise restoring torque Ts is generated when the steering angle θs increases from zero in the counterclockwise direction. Thus, the restoring torque Ts acts to restore the steering wheel 31*a* to the neutral position.

On the other hand, when the steering angle θs is controlled by means of automatic steering control of the travel controller 8, the reaction force control unit 37 sets the reference angle to the target steering angle θt and calculates the restoring torque Ts for restoring the steering angle θs to the target steering angle θt. The restoring torque Ts characteristic when the steering angle θs is controlled by means of automatic steering control will be described with reference to FIG. 4B.

In this case, the characteristic curve of the restoring torque Ts is offset such that the restoring torque Ts becomes zero when the steering angle θs is the target steering angle θt. Thus, the restoring torque Ts acts to restore the steering angle θs to the target steering angle θt. In other words, rotational torque is applied to the reaction force actuator 12 such that the steering angle θs becomes the target steering angle θt, and a steering angle control torque is generated in the steering wheel 31*a*. Thus, if the driver is not operating the steering wheel 31*a*, the reaction force actuator 12 is servo-controlled such that the steering angle θs matches the target steering angle θt. The steering angle θs becomes the target steering angle θt determined by the travel controller 8, and the steering angle θs is controlled such that the host vehicle travels along the target travel path.

Figure 5:
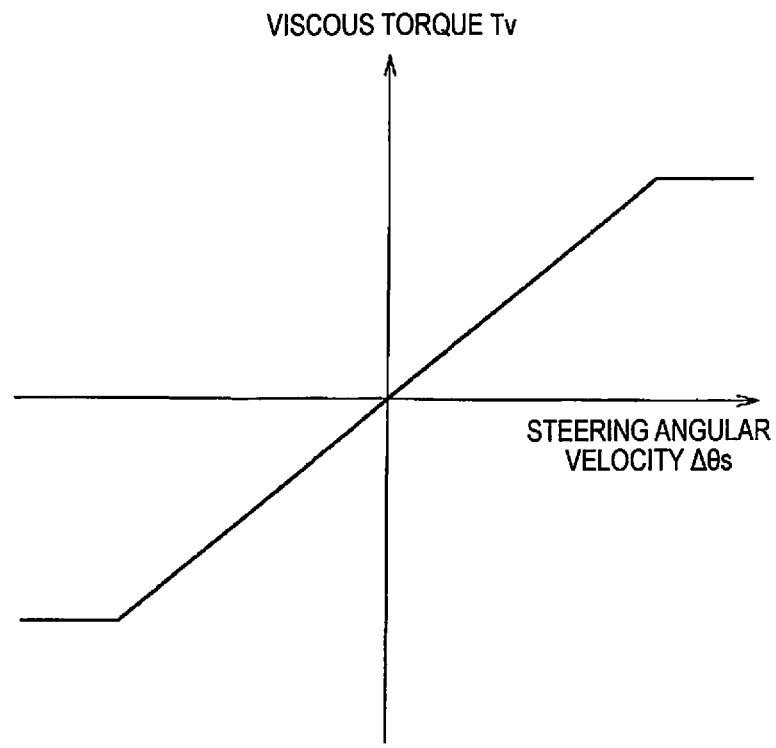
FIG. 5 is a diagram illustrating one example of a viscous torque characteristic.

Next, the viscous torque Tv is obtained by copying the viscous component (damping component) of the steering reaction force torque acting on the steering wheel 31*a* in accordance with the steering angular velocity Δθs. The viscous torque Tv has the characteristic shown in FIG. 5, for example, and changes in accordance with the steering angular velocity Δθs.

In addition, the friction torque Tf is obtained by copying the friction component of the steering reaction force torque acting on the steering wheel 31*a* in accordance with the steering angular velocity Δθs. By adding the friction torque Tf to the steering reaction force torque, the steering wheel 31*a* is less easily moved, even if a slight steering input from the driver is applied to the steering wheel 31*a*, so that it is possible to stabilize the steering wheel 31*a*.

Figure 6:
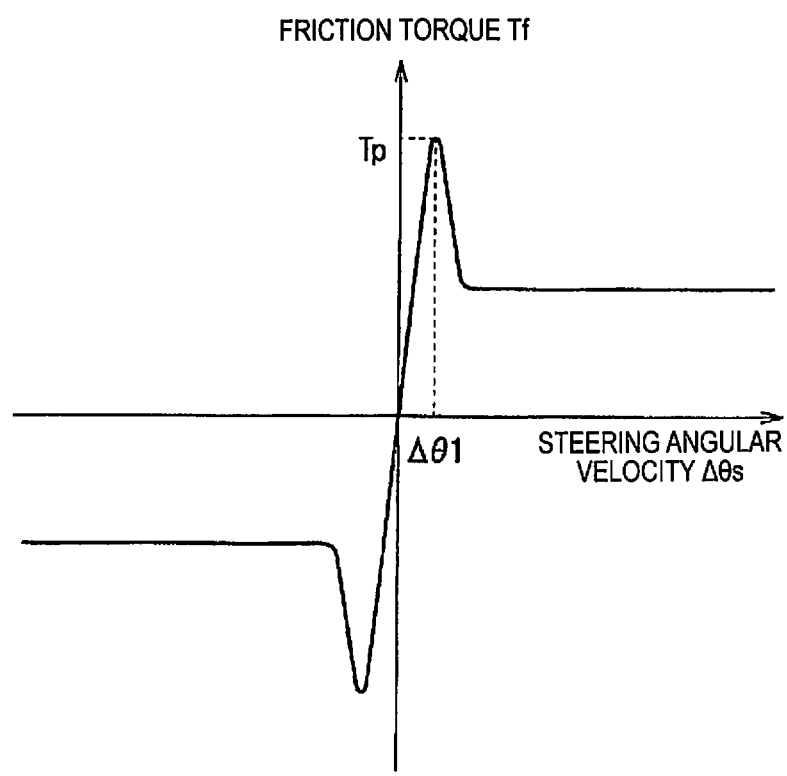
FIG. 6 is a diagram illustrating one example of a friction torque characteristic.

The friction torque Tf can have the characteristic shown in FIG. 6, for example. When the absolute value of the steering angular velocity Δθs increases from 0 to Δθ1, the absolute value of the friction torque Tf increases to a peak value Tp. When the steering angular velocity Δθs exceeds the peak value Tp, the static friction changes to dynamic friction, so that the absolute value of the friction torque Tf decreases rapidly, and then becomes almost a constant value even if the absolute value of the steering angular velocity Δθs increases. In this manner, the friction torque Tf can have a characteristic in which the friction that acts on the steering wheel 31*a* changes between static friction and dynamic friction.

Figure 3:
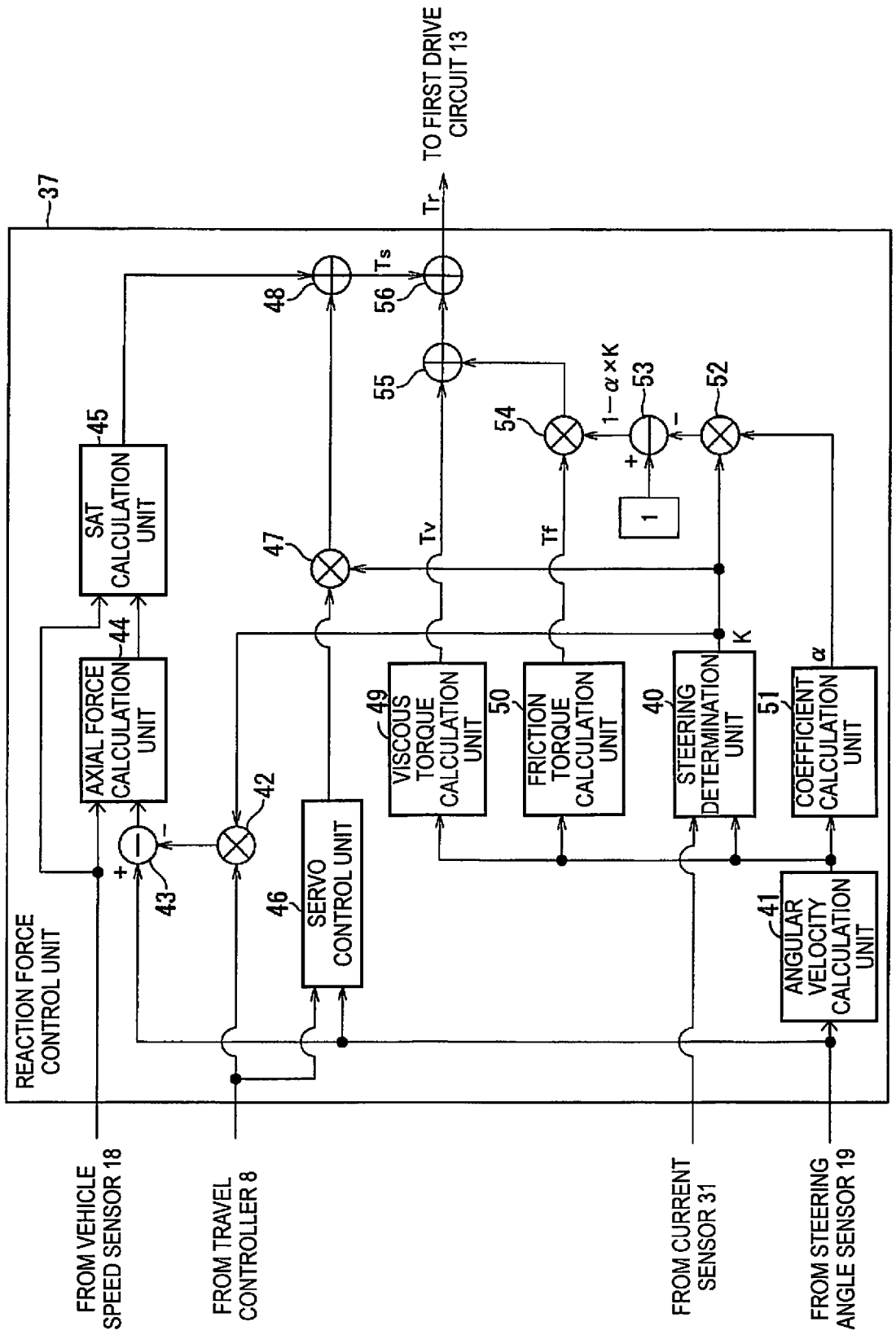
FIG. 3 is a block diagram illustrating a configuration example of a reaction force control unit of FIG. 2.

Reference is made to FIG. 3. As has been described with reference to FIGS. 4A and 4B, the reaction force control unit 37 changes the restoring torque Ts characteristic depending on whether the steering angle θs is controlled by means of automatic steering control. Thus, the reaction force control unit 37 has a steering determination unit 40 that determines whether the steering wheel 31*a* is being manually operated by the driver.

The steering determination unit 40 outputs a first gain K, which indicates whether the steering wheel 31*a* is being manually operated. The value of the first gain K is "0" when the steering wheel 31*a* is being manually operated, and the value of the first gain K is "1" when the steering wheel 31*a* is not being manually operated. For example, the steering determination unit 40 can determines whether the steering wheel 31*a* is being manually operated based on the output of the reaction force actuator 12 and the steering angular velocity Δθs.

The steering determination unit 40 can determine whether the output of the reaction force actuator 12 is "0" based on the drive current of the reaction force actuator 12 detected by the current sensor 31*c*. In addition, the steering determination unit 40 can acquire the steering angular velocity Δθs that is output by an angular velocity calculation unit 41, which differentiates the steering angle θs. For example, if both the output of the reaction force actuator 12 and the steering angular velocity Δθs are "0," the steering determination unit 40 can determine that the steering wheel 31*a* is not being manually operated. In addition, if both the output of the reaction force actuator 12 and the steering angular velocity Δθs are not "0," the steering determination unit 40 can determine that the steering wheel 31*a* is not being manually operated.

On the other hand, if one of the reaction force actuator 12 and the steering angular velocity Δθs is "0" and the other is not "0," the steering determination unit 40 can determine that the steering wheel 31*a* is being manually operated. In addition, for example, the steering determination unit 40 can determine whether the steering wheel 31*a* is being manually operated based on a dynamic model of the reaction force actuator 12 and the steering wheel 31*a*.

For example, if the inertia of the steering wheel 31*a* and the reaction force actuator 12 is J, the torque of the reaction force actuator 12 is Tm, and the steering torque that the driver applies to the steering wheel 31*a* is Td, the steering torque Td can be calculated from $Td = Js^2 - Tm$. s is the Laplace operator. When the steering torque Td is less than a threshold value, the steering determination unit 40 can determine that the steering wheel 31*a* is not being manually operated, and when the steering torque Td is greater than or equal to the threshold value, the steering determination unit can determine that the steering wheel 31*a* is being manually operated.

In addition, the steering determination unit 40 can determine whether the steering wheel 31*a* is being manually operated by means of a touch sensor provided on the steering wheel 31*a* or from an image of the driver captured by an onboard camera. For example, if the steering wheel 31*a* is held by the driver, the steering determination unit 40 can determine that the steering wheel 31*a* is being manually operated if the steering torque Td is greater than or equal to the threshold value.

The steering determination unit 40 can combine these determination processes to determine the value of the first gain K. For example, even if it is determined by the steering angular velocity, the output of the reaction force actuator 12, and the aforementioned dynamic model, that the steering wheel 31*a* is not being manually operated, the steering determination unit 40 can set the value of the first gain K to "0" if it is determined by the touch sensor or the onboard camera that the steering wheel 31*a* is being manually operated by the driver.

In order to calculate the restoring torque Ts, the reaction force control unit 37 includes a multiplier 42, a subtractor 43, an axial force calculation unit 44, an SAT calculation unit 45, a servo control unit 46, a multiplier 47, and an adder 48. The multiplier 42 multiplies the target steering angle θt output from the travel controller 8 by the first gain K. The multiplier 42 inputs the product (K×θt) of the target steering angle θt and the first gain K to the subtractor 43. The subtractor 43 inputs the difference (θs−(K×θt)), obtained by subtraction of the product (K×θt) from the steering angle θs, to the axial force calculation unit 44. As a result, when the steering wheel 31*a* is being manually operated (K=0), the steering angle θs is input to the axial force calculation unit 44 as is. When the steering wheel 31*a* is not being manually operated (K=1), the difference obtained by subtracting the target steering angle θt from the steering angle θs (that is, the angle (θs−θt) obtained by offsetting the steering angle θs by the target steering angle θt) is input to the axial force calculation unit 44.

The axial force calculation unit 44 references a steering angle—axial force conversion map (MAP) and estimates the rack axial force based on the difference (θs−(K×θt) and the vehicle speed of the host vehicle. For example, the steering angle—axial force conversion map represents the relationship between the rack axial force and the steering angle for each vehicle speed in a conventional steering device calculated in advance by means of experiment, or the like. The axial force calculation unit 44 outputs the calculation result to the SAT calculation unit 45. The SAT calculation unit 45 calculates the self-aligning torque based on the rack axial force estimated by the axial force calculation unit 44 and the vehicle speed of the host vehicle.

Figure 4A:
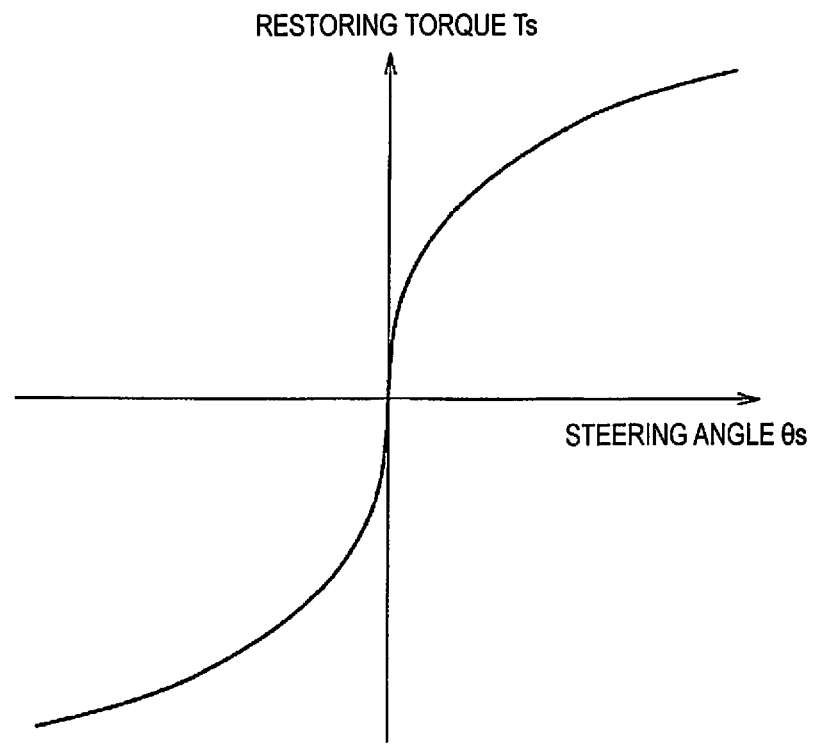
FIG. 4A is an explanatory view of one example of a restoring torque characteristic curve.
Figure 4B:
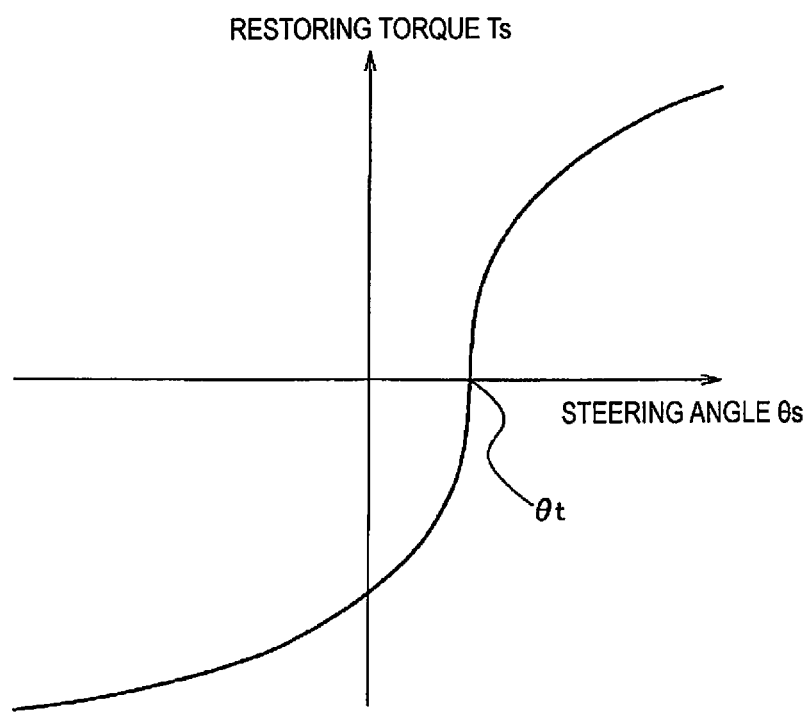
FIG. 4B is an explanatory view of a restoring torque characteristic curve that is offset based on the target steering angle.

If the steering wheel 31*a* is being manually operated (K=0), the rack axial force is estimated using the steering angle θs, so that the self-aligning torque becomes a steering reaction force torque that restores the steering wheel 31*a* to the neutral position, as shown in FIG. 4A. If the steering wheel 31*a* is not being manually operated (K=1), the rack axial force is estimated using the angle (θs−θt) obtained by offsetting the steering angle θs by the target steering angle θt, so that the self-aligning torque becomes a steering reaction force torque that restores the steering angle θs to the target steering angle θt, as shown in FIG. 4B.

If there remains a difference between the target steering angle θt and the steering angle θs steered so as to return to the target steering angle θt by the SAT calculation unit 45, the servo control unit 46 servo-controls the reaction force actuator 12 such that the steering angle θs matches the target steering angle θt. The multiplier 47 multiplies the first gain K and the servo signal calculated by the servo control unit 46 and outputs the product to the adder 48.

The adder 48 outputs the sum of the self-aligning torque and the product of the servo signal and the first gain K, as the restoring torque Ts. For this reason, when the steering wheel 31*a* is manually operated (K=0), the restoring torque Ts does not include the servo signal calculated by the servo control unit 46.

The reaction force control unit 37 includes a viscous torque calculation unit 49 that calculates the viscous torque Tv and a friction torque calculation unit 50 that calculates the friction torque Tf. The viscous torque calculation unit 49 can calculate the viscous torque Tv using a conversion map that has the characteristic shown in FIG. 5, for example, based on the steering angular velocity Δθs. The friction torque calculation unit 50 can calculate the friction torque Tf using a conversion map that has the characteristic shown in FIG. 6, for example, based on the steering angular velocity Δθs.

In a state in which the steering angle θs is being controlled by means of automatic steering control (for example, a state in which the steering wheel 31*a* is not being manually operated), the steering wheel 31*a* will shake due to the friction torque Tf, and the driver can experience discomfort. In addition, if there is a great amount of shaking, it can be reflected by the behavior of the host vehicle. This occurs, for example, while the steering wheel 31*a* is being turned by the reaction force actuator 12, when the coefficient of friction decreases rapidly as the slip speed increases, or when a discontinuous friction decrease occurs during a transition from static to dynamic friction. As a result, smooth steering by means of automatic steering control may be hindered by the friction torque Tf.

Thus, the reaction force control unit 37 calculates a second gain (1−α×K) for suppressing the friction torque Tf when the steering wheel 31*a* is not being manually operated. Specifically, the reaction force control unit 37 includes a coefficient calculation unit 51, a multiplier 52, and a subtractor 53. The coefficient calculation unit 51 calculates a coefficient α corresponding to the steering angular velocity Δθs. The coefficient α becomes "0" when the steering angular velocity Δθs is higher than the threshold value.

Figure 7A:
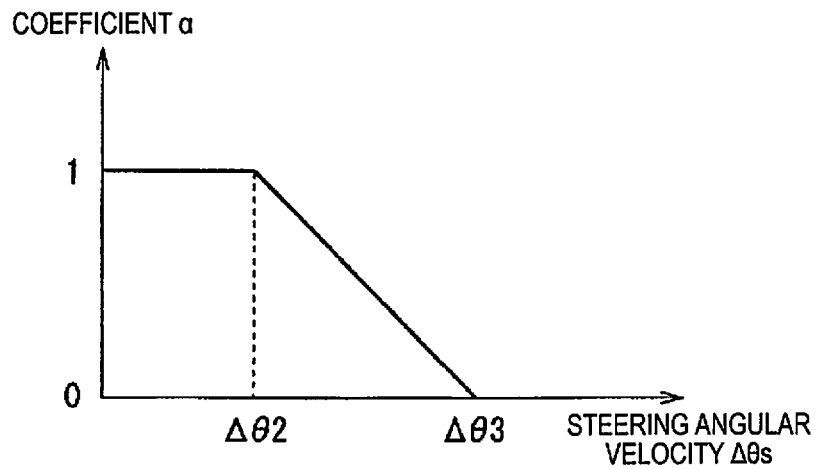
FIG. 7A is an explanatory diagram of a first example of a coefficient $\alpha$ that corresponds to the steering angular velocity.
Figure 7B:
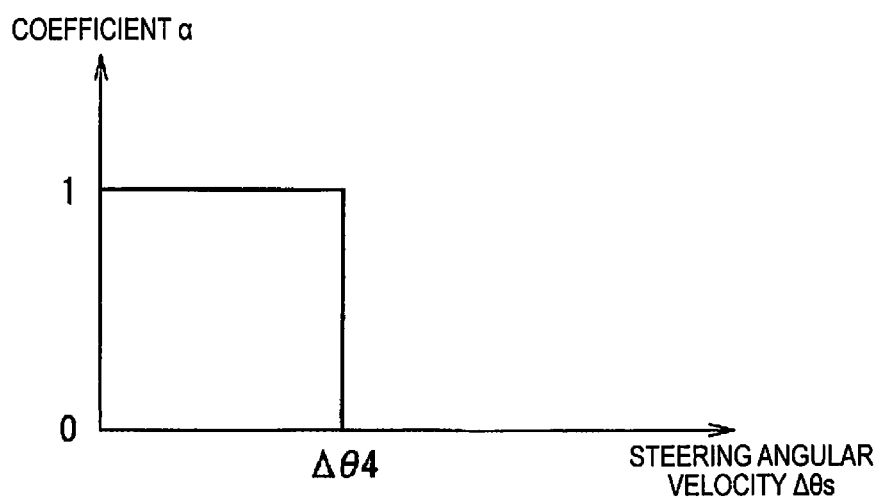
FIG. 7B is an explanatory diagram of a second example of a coefficient $\alpha$ that corresponds to the steering angular velocity.

For example, the coefficient α can have the characteristic shown in FIG. 7A. When the steering angular velocity Δθs is less than or equal to a first threshold value Δθ2, the coefficient α is "1"; in the range of greater than or equal to the first threshold value Δθ2 and less than or equal to a second threshold value Δθ3, the coefficient α decreases from "1" to "0"; and when the steering angular velocity is greater than or equal to the second threshold value Δθ3, the coefficient α is "0." The coefficient α can have the characteristic shown in FIG. 7B. When the steering angular velocity Δθs is less than a third threshold value Δθ4, the coefficient α is "1"; and when the steering angular velocity is greater than or equal to the third threshold value Δθ4, the coefficient α is "0."

The multiplier 52 calculates a product (Δ×K) of the first gain K and the coefficient α, and the subtractor 53 calculates the second gain (1−α×K). The second gain (1−α×K) is multiplied by the friction torque Tf by a multiplier 54. When the steering determination unit 40 has determined that the steering wheel 31*a* is being manually operated (K=0), the second gain (1−α×K) is set to "1." As a result, the friction torque Tf is output from the multiplier 54.

In addition, when the steering angular velocity Δθs is high and the coefficient α is "0," the second gain (1−α×K) is set to "1." This is because an upper limit is provided to the steering angular velocity Δθs in an automatic steering control; thus, if the steering angular velocity Δθs is greater than the upper limit of the automatic steering control, it can be determined that the steering wheel 31*a* is being manually operated. When the steering wheel 31*a* is manually operated, the steering angular velocity Δθs will increase more quickly. Manual operation can thus be quickly detected. As a result, even if there is a delay in the determination by the steering determination unit 40 or detection of manual operation fails, the friction torque Tf can be appropriately applied at the time of the driver's manual operation.

On the other hand, when the steering determination unit 40 determines that the steering wheel 31*a* is not being manually operated (K=1), the steering angular velocity Δθs is low, and the coefficient α is not "0," (Δ×K) does not become "0" and the friction torque Tf output from the multiplier 54 is suppressed. For example, if the coefficient α is "1," the second gain (1−α×K) is set to "0," so the output of the multiplier 54 becomes "0" and the friction torque Tf is completely canceled.

As a result, in a situation in which the steering wheel 31*a* is not being manually operated and the steering angle θs is controlled by means of automatic steering control, it is possible to suppress the friction torque Tf that acts on the steering wheel 31*a*. For this reason, in an automatic steering control, it is possible to prevent the shaking of the steering wheel 31*a* caused by the friction torque Tf, and it is possible to apply a steering reaction force torque that allows smooth steering.

Here, by decreasing the coefficient α as the steering angular velocity Δθs increases, as in the range from Δθ2 to Δθ3 in FIG. 7A, it is possible to gradually reduce the degree of suppression of the friction torque Tf as the steering angular velocity Δθs increases. As a result, it is possible to prevent the deterioration of the steering feel due to a sudden change in the suppression of the friction torque Tf.

The reason that the gain (α×K) obtained by multiplying the coefficient α by the first gain K is used when the suppression of the friction torque Tf is changed in accordance with a manual operation of the steering wheel 31*a*, and that the first gain K which is not multiplied by the coefficient α is used when the restoring torque Ts is changed is explained below. For example, the scenario shown in FIG. 4B is assumed in which the steering wheel 31*a* is steered by means of automatic steering control during travel on a curved path, and the restoring torque Ts is offset by the target steering angle Δt.

Here, it is conceivable that the coefficient α becomes 0 due to the generation of the steering angular velocity Δθs, such as when the driver accidently touches the steering wheel 31*a* and the steering angular velocity Δθs is generated, or when the steering angular velocity Δθs increases temporarily during automatic steering control. When the gain (α×K) obtained by multiplying the coefficient α by the first gain K is being used, if the first gain K (α×K) becomes 0 due to the generation of the steering angular velocity Δθs as described above, it is determined that the steering wheel 31*a* is being manually operated, so that there is the risk that the automatic steering control will stop during travel along the curved path. Therefore, by using the first gain K which is not multiplied by the coefficient α when the restoring torque Ts is changed, it is not determined that the steering wheel 31*a* is being manually operated when the steering angular velocity Δθs is generated, in order to prevent the termination of automatic steering control.

The reaction force control unit 37 includes adders 55 and 56, which add the restoring torque Ts, the friction torque Tf, and the viscous torque Tv to calculate the command steering torque Tr=(Ts+(1−α×K)×(Tf+Tv). The adder 55 calculates the sum ((1−α×K)×Tf+Tv) of the output ((1−α×K)×Tf) of the multiplier 54 and the viscous torque Tv. The adder 56 outputs the sum (Ts+(1−α×K)×Tf+Tv) of the output of the adder 55 and the restoring torque Ts as the command steering torque Tr to the first drive circuit 13.

Figure 8:
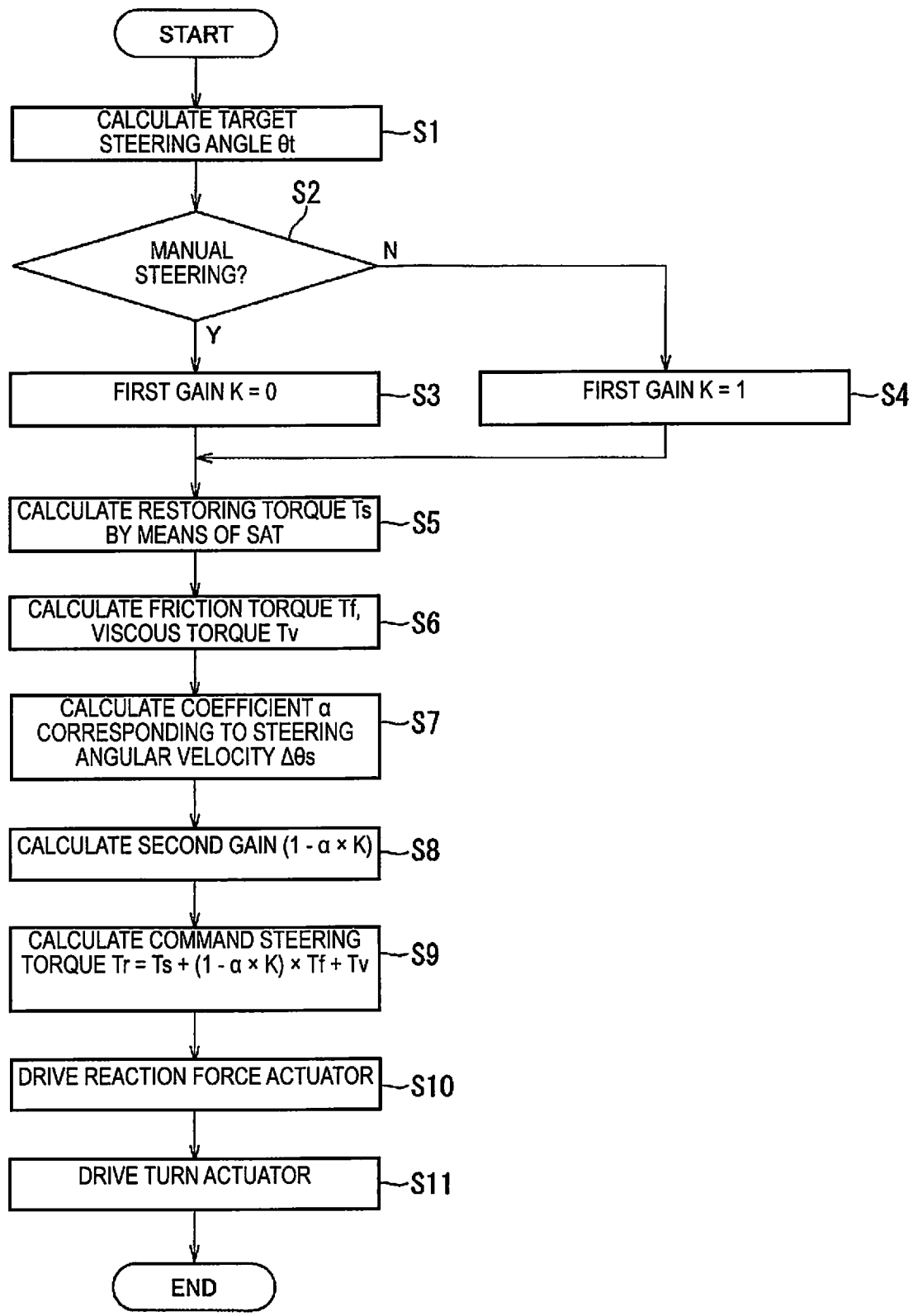
FIG. 8 is a flow chart of one example of steering control method according to the embodiment.

Next, one example of the steering control method according to the embodiment will be described with reference to FIG. 8. In Step S1, the travel controller 8 determines the target steering angle θt for causing the host vehicle to travel along the target travel path set in the automatic steering control of the driving assistance control or the autonomous driving control.

In Step S2, the steering determination unit 40 determines whether the steering wheel 31*a* is being manually operated. If the steering wheel 31*a* is being manually operated (Step S2=Y), the process proceeds to Step S3. If the steering wheel 31*a* is not being manually operated (Step S2=N), the process proceeds to Step S4. In Step S3, the steering determination unit 40 sets the first gain K to "0." Then, the process proceeds to Step S5.

In Step S4, the steering determination unit 40 sets the first gain K to "1." Then, the process proceeds to Step S5. In Step S5, the multiplier 42, the subtractor 43, the axial force calculation unit 44, the SAT calculation unit 45, the servo control unit 46, the multiplier 47, and the adder 48 calculate the restoring torque Ts by means of self-alignment torque.

When the steering wheel 31*a* is being manually operated (K=0), the axial force calculation unit 44 estimates the rack axial force based on the steering angle θs. For this reason, the self-aligning torque becomes a steering reaction force torque that restores the steering wheel 31*a* to the neutral position. When the steering wheel 31*a* is not being manually operated (K=1), the axial force calculation unit 44 estimates the rack axial force using the angle (θs−θt) obtained by offsetting the steering angle θs by the target steering angle θt. For this reason, the self-aligning torque becomes a steering reaction force torque that restores the steering angle θs to the target steering angle θt.

The servo control unit 46 servo-controls the reaction force actuator 12 such that the steering angle θs matches the target steering angle θt. The multiplier 47 and the adder 48 calculates the sum of the self-aligning torque and the product of the first gain K and the servo signal of the servo control unit 46 as the restoring torque Ts. Thus, when the steering wheel 31*a* is not being manually operated (K=1), the restoring torque Ts includes the servo signal of the servo control unit 46; and when the steering wheel 31*a* is being manually operated (K=0), the restoring torque Ts does not include the servo signal of the servo control unit 46.

In Step S6, the viscous torque calculation unit 49 calculates the viscous torque Tv based on the steering angular velocity Δθs. In addition, the friction torque calculation unit 50 calculates the friction torque Tf based on the steering angular velocity Δθs. In Step S7, the coefficient calculation unit 51 calculates the coefficient α corresponding to the steering angular velocity Δθs. In Step S8, the multiplier 52 and the subtractor 53 calculates the second gain (1−α×K) for suppressing the friction torque Tf when the steering wheel 31*a* is not being manually operated.

In Step S9, the adders 55 and 56 add the restoring torque Ts, the friction torque Tf, and the viscous torque Tv to calculate the command steering torque Tr=(Ts+(1−α×K)× Tf+Tv). In Step S10, the first drive circuit 13 instructs the command current to be output to the reaction force actuator 12 by means of torque feedback for matching the actual steering reaction force torque estimated from the drive current of the reaction force actuator 12 with the command steering torque Tr, in order to drive the reaction force actuator 12. In Step S11, the steering control unit 36 determines the command turning angle in accordance with the steering angular velocity Δθs and the steering angle θs of the steering wheel 31*a*. The second drive circuit 15 controls the command current to the turn actuator 14 by means of an angle feedback for matching the actual turning angle detected by the turning angle sensor 35 with the command turning angle, in order to drive the turn actuator 14. The process ends thereafter.

Effects of the Embodiment (1) The host vehicle 1 is equipped with a steer-by-wire steering mechanism in which the steering wheel 31*a* and the steered wheels 34FL and 34FR are mechanically separated. The reaction force control unit 37 sets a steering reaction force including the restoring torque Ts for restoring the steering angle θs of the steering wheel 31*a* to the reference angle, the viscous torque Tv corresponding to a the steering angular velocity Δθs of the steering wheel 31*a*, and the friction torque Tf corresponding to the steering angular velocity Δθs, and controls the reaction force actuator 12 that applies rotational torque to the steering wheel 31a such that the steering reaction force is generated in the steering wheel 31a.

The steering control unit 36 controls the turning angles of the steered wheels 34FL and 34FR in accordance with the steering angle θs. The steering determination unit 40 determines whether the driver is operating the steering wheel 31a. If the driver is not operating the steering wheel 31a, the travel controller 8 sets the target travel path on which the host vehicle travels, the reaction force control unit 37 controls the reaction force actuator 12 such that the steering angle θs of the steering wheel 31a becomes the target steering angle for causing the host vehicle to travel along the target travel path, and the multiplier 54 suppresses the friction torque Tf included in the command steering torque Tr. As a result, in an automatic steering control, it is possible to prevent the shaking of the steering wheel 31a caused by the friction torque Tf, and it is possible to apply a steering reaction force torque that allows smooth steering.

(2) The multiplier 54 multiplies the friction torque Tf by the second gain $(1-\alpha \times K)$ in order to suppress the friction torque Tf. Since the coefficient α is set to "0" when the steering angular velocity Δθs is higher than the threshold value, the second gain $(1-\alpha \times K)$ becomes "1" when the steering angular velocity Δθs is higher than the threshold value, and the friction torque Tf is not suppressed. When the steering angular velocity Δθs is high, the steering wheel 31a is thought to be manually operated, so that it is possible to prevent the manual steering feel from being impaired due to suppression of the friction torque Tf.

(3) The coefficient calculation unit 51 reduces the value of the coefficient α as the steering angular velocity Δθs increases. For this reason, the degree of suppression of the friction torque Tf is gradually decreased as the steering angular velocity Δθs increases. As a result, it is possible to prevent the deterioration of the steering feel due to a sudden change in the suppression of the friction torque Tf.

(4) The steering determination unit 40 sets the first gain K to "0" when the driver is holding but not operating the steering wheel. Accordingly, the friction torque Tf is not suppressed. As a result, it is possible to appropriately apply the friction torque Tf when steering is started from a state in which the steering wheel is being held, and to prevent the steering feel from being impaired due to suppression of the friction torque Tf.

All of the examples and conditional terminology described herein are educational in nature and are intended to inform the reader's understanding of the present invention and the concepts provided by the inventors for the advancement of technology, and should be interpreted without being restricted to the above-described specific examples and conditions or to the configurations of the examples in the present Specification relating to the demonstration of superiority and inferiority of the present invention. Although the embodiment of the present invention has been described in detail, it should be understood that various changes, substitutions, and modifications can be made thereto without departing from the spirit and scope of the present invention.

The invention claimed is:

1. A steering control method for a vehicle equipped with a steer-by-wire steering mechanism in which a steering wheel and a steered wheel are mechanically separated, the steering control method comprising:

setting a steering reaction force that includes a restoration component for restoring a steering angle of the steering wheel to a reference angle, a viscous component that corresponds to a steering angular velocity of the steering wheel, and a friction component that corresponds to the steering angular velocity;

controlling an actuator that applies a rotational torque to the steering wheel such that the steering reaction force is generated in the steering wheel;

controlling a turning angle of the steered wheel in accordance with the steering angle;

determining whether a driver is operating the steering wheel, and when the driver is determined to not be operating the steering wheel setting a target travel path along which the vehicle travels controlling the actuator such that the steering angle of the steering wheel becomes a target steering angle for causing the vehicle to travel along the target travel path; and suppressing the friction component included in the steering reaction force.

2. The steering control method according to claim 1, wherein
the friction component is not suppressed if the steering angular velocity is higher than a threshold value.

3. The steering control method according to claim 1, wherein
the degree of suppression of the friction component is decreased as the steering angular velocity increases.

4. The steering control method according to claim 1, wherein
the friction component is not suppressed if the driver holds but does not operate the steering wheel.

5. A steering control device for a vehicle equipped with a steer-by-wire steering mechanism in which a steering wheel and a steered wheel are mechanically separated, the steering control device comprising:

an actuator configured to apply a rotational torque to the steering wheel;

a drive circuit configured to drive the actuator; and a controller configured to set a steering reaction force that includes a restoration component for restoring a steering angle of the steering wheel to a reference angle, a viscous component that corresponds to a steering angular velocity of the steering wheel, and a friction component that corresponds to the steering angular velocity; and outputting a control signal to the drive circuit for causing the steering wheel to generate the steering reaction force, wherein the controller being configured to
control the turning angle of the steered wheel in accordance with the steering angle, and
determine whether a driver is operating the steering wheel,
when the driver is determined to not be operating the steering wheel, the controller being further configured to
control the actuator such that the steering angle becomes a target steering angle for causing the vehicle to travel along a target travel path, and
suppress the friction component included in the steering reaction force.

* * * * *